United States Patent [19]

Beccaris

[11] Patent Number: 5,127,504
[45] Date of Patent: Jul. 7, 1992

[54] CLUTCH HAVING A PLURALITY OF FRICTION DISCS, ESPECIALLY FOR MOTOR VEHICLES

[75] Inventor: Carlo Beccaris, Santena, Italy

[73] Assignee: Valeo, Paris Cedex, France

[21] Appl. No.: 708,861

[22] Filed: May 31, 1991

[30] Foreign Application Priority Data

May 31, 1990 [FR] France ............................. 90 06766

[51] Int. Cl.⁵ .................. F16D 13/44; B60K 17/02
[52] U.S. Cl. ........................... 192/70.13; 192/70.16;
                                           192/70.19; 192/109 B
[58] Field of Search ............... 192/70.16, 70.18, 70.19,
        192/70.2, 70.25, 70.27, 70.3, 70.13, 110 R, 110
                                           S, 109 R, 109 A, 109 B

[56] References Cited

U.S. PATENT DOCUMENTS

| 1,803,430 | 5/1931 | Hand ......................... 192/70.19 X |
| 3,334,716 | 8/1967 | Spokas . |
| 4,574,449 | 3/1986 | Wussow ......................... 29/402.06 |

FOREIGN PATENT DOCUMENTS

| 450230 | 8/1948 | Canada ............................ 192/109 R |
| 3905928 | 9/1989 | Fed. Rep. of Germany . |
| 2623862 | 6/1989 | France . |
| 0164821 | 6/1989 | Japan ............................. 192/109 A |
| 0210621 | 8/1989 | Japan ............................. 192/109 A |
| 2083580 | 3/1982 | United Kingdom . |
| 2161868 | 1/1986 | United Kingdom ........... 192/109 R |

Primary Examiner—Rodney H. Bonck
Attorney, Agent, or Firm—Longacre & White

[57] ABSTRACT

A clutch comprises a reaction plate, a cover plate, a pressure plate, at least two friction discs arranged between the pressure and reaction plates, and at least two intermediate discs. The friction discs are arranged alternately with the intermediate discs. The latter are coupled for rotation with the reaction plate by virtue of at least one intermediate driving member. The intermediate discs carry a first part of a coupling of the tenon and mortice type, while the intermediate member carries the second part of the same coupling. The first part of the coupling comprises at least two elements, at least one of which defines an axis of symmetry which is not coincident with the center of rotation of the associated intermediate disc.

7 Claims, 5 Drawing Sheets

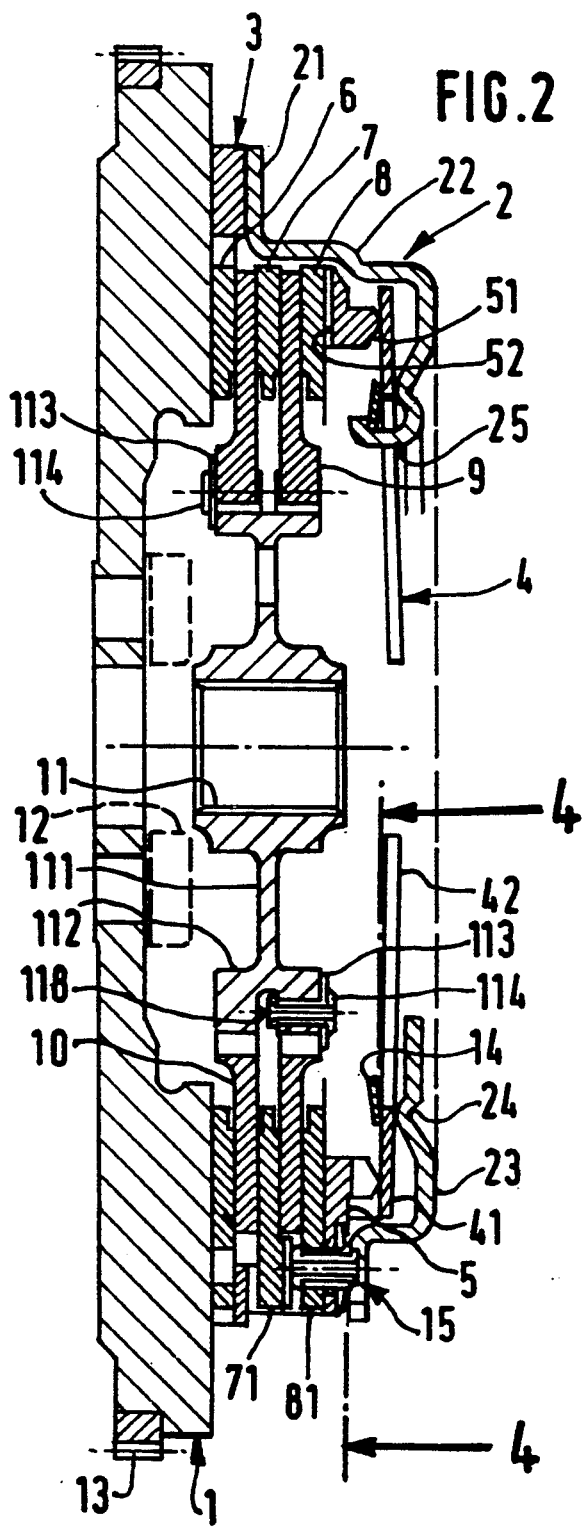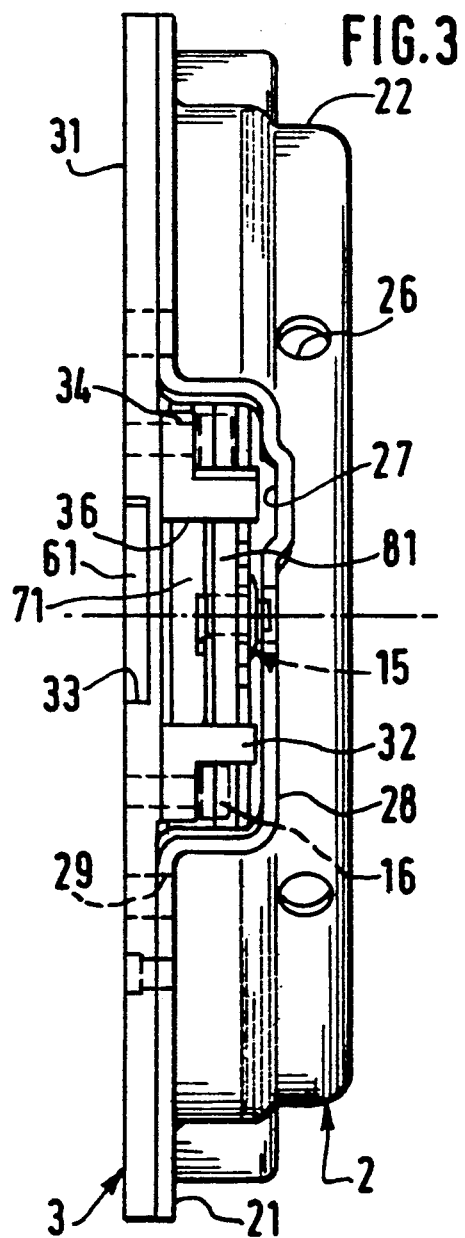

CLUTCH HAVING A PLURALITY OF FRICTION DISCS, ESPECIALLY FOR MOTOR VEHICLES

FIELD OF THE INVENTION

This invention relates to clutches of the kind having a plurality of friction discs, especially for motor vehicles. More particularly, the field of the invention is that of clutches of the above kind comprising: a reaction plate; a cover plate which is secured to the reaction plate; a pressure plate which is fixed with respect to the cover plate to the extent that it rotates with the latter, but which is mounted for axial movement with respect to the cover plate; and, arranged between the pressure plate and the reaction plate, firstly at least two friction discs which are fixed to a hub for rotation with the hub, and secondly at least two intermidiate discs which are mounted for rotation with the reaction plate and the cover plate, with the friction discs being arranged alternately with the intermediate discs.

BACKGROUND OF THE INVENTION

A clutch of the above kind is described in the specification of French published patent application No. FR 2 623 862A. In that specification, the intermediate discs are coupled with the reaction plate for rotation with the latter, the intermediate discs being movable axially by virtue of a plurality of intermediate driving members in the form of spacing blocks. The intermediate discs define mortices.

In this way, a coupling, of the tenon and mortice type, is formed. The intermediate discs carry a first part of this coupling, while the intermediate driving members carry the second, complementary, part of the coupling. The first part of the coupling includes at least two elements, which are mortices in the arrangement described in the above mentioned French patent specification.

In addition, in connection with clutches of the kind intended particularly for fast motor vehicles such as racing or sports cars, it is desirable or essential for the clutch to be able to be conveniently inspected and subsequently refitted. Accordingly, a specific problem arises in that the two faces of the intermediate discs, which in certain cases are not adapted to be reversed, i.e. each disc must be fitted the right way round. This may for example be due to the nature of the materials used, or the nature of the connection between the surfaces after wear between the intermediate disc and its associated friction disc has taken place.

DISCUSSION OF THE INVENTION

An object of the present invention is to overcome the above mentioned drawback and to provide a new arrangement in which the clutch can be readily inspected and refitted without reversal of the orientation of the intermediate discs; while also obtaining other advantages.

In accordance with the invention, a clutch of the kind having a plurality of friction discs and comprising: a reaction plate; a cover plate fixed to the said reaction plate; a pressure plate mounted for rotation with the said cover plate and for axial movement with respect to the latter; at least two friction discs disposed between the pressure plate and reaction plate and fixed with respect to a hub for rotation with the latter; and at least two intermediate discs disposed between the pressure plate and the reaction plate and mounted for rotation with the reaction plate and the cover plate, with the friction discs being arranged alternately with the intermediate discs and the latter being coupled in rotation with the reaction plate through at least one intermediate driving member, while the intermediate discs carry a first part of a coupling of the tenon and mortice type and the intermediate driving member carries the second part of the same coupling, the said first part of the coupling having at least two elements, is characterised in that the axis of symmetry of at least one element of the first part of the said coupling does not pass through the centre of rotation of the intermediate disc concerned.

The clutch according to the invention is able to be removed for checking the intermediate discs and friction discs, and to be refitted afterwards, without there being any possibility of doubt arising as to whether the intermediate discs have been refitted the right way round.

In accordance with a further feature of the invention, one of the edges of at least one element of the first part of the tenon and mortice type coupling passes through the centre of rotation of the intermediate disc. Thus the difference between the two edges of this element is substantial, in such a way that there is no problem in recognising the correct orientation of the components: this enables them to be refitted the right way round first time.

This arrangement is of particular advantage in the case where a single intermediate driving member is provided. In that case, when an intermediate disc is adjacent to the reaction plate, it is possible to form at least one notch in the surface of the said intermediate driving member which is directed towards the reaction plate, in order to locate the intermediate disc positively in the axial direction.

This intermediate driving member then has axial lugs defining tenons or mortices, for driving one or more further intermediate discs. With this arrangement, inspection of the intermediate disc adjacent to the reaction plate can be carried out rapidly and calls for no disassembly, since the intermedite member is preferably fixed to the reaction plate.

In addition, disassembly of one or more further intermediate discs can be carried out rapidly, and is performed by simple insertion into the said axial lugs of the intermediate driving member. This is of particular advantage in the case of racing or rally vehicles having intermediate discs and friction discs of carbon based materials.

The description which follows illustrates the invention in detail, by way of example only and with reference to the accompanying drawings.

BRIEF DESCRIPTION OF THE DRAWINGS

FIG. 2 is a view in cross section taken on the line 2—2 in FIG. 1.

FIG. 3 is a view as seen in the direction of the arrow 3 in FIG. 1.

DESCRIPTION OF PREFERRED EMBODIMENTS OF THE INVENTION

Figure 1:
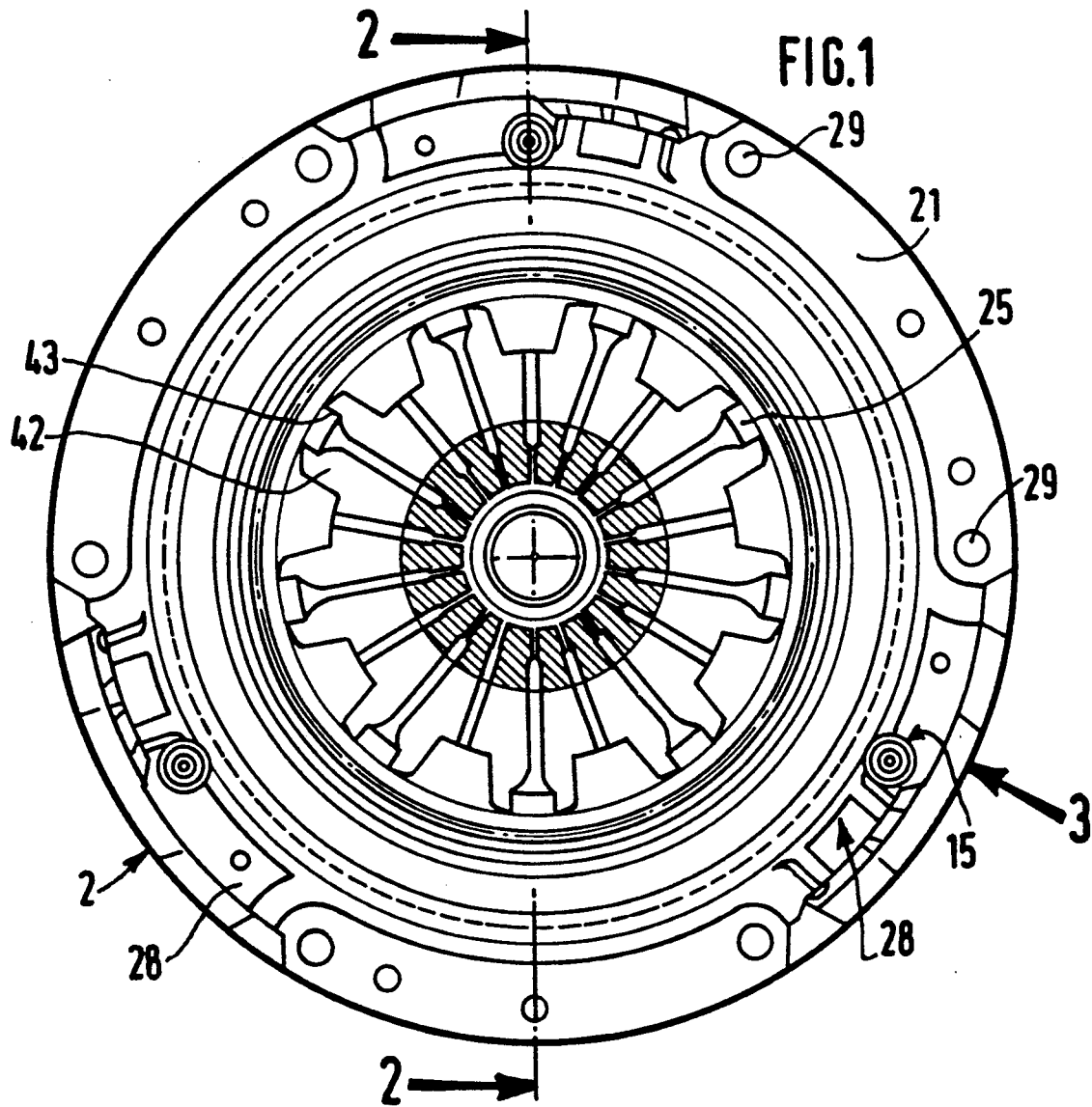
FIG. 1 is a view in elevation of the clutch in accordance with the invention.

The clutch which will be described below is a clutch of the kind having two friction discs, particularly suitable for fast motor vehicles such as sports or racing cars. It comprises a plurality of annular members, all coaxial with each other, namely a reaction plate 1, a cover plate 2, an intermediate crown 3, a diaphragm 4, intermediate discs 6, 7 and 8, friction discs 9 and 10, and a hub 11. The reaction plate 1 is also the engine flywheel, and is fastened to the crankshaft (not shown) of the engine of the vehicle, in this particular example by means of bolts or studs 12 which are shown diagrammatically.

The cover plate 2 is generally in the form of a hollow dish, and has an outwardly projecting radial fastening flange 21 which is joined to an annular skirt portion 22 oriented axially. The skirt portion 22 is joined to a base portion 23 which extends generally radially and towards the axis of the assembly. The base portion 23 has a projecting bead 24, and is also provided with assembly tabs 25. It has a central opening. The bead 24 acts as a primary stop element for the diaphragm 4. More precisely, the diaphragm 4 has a peripheral portion 41 defining a Belleville ring, and a central portion which is divided into radial fingers 42 separated by gaps (see FIG. 1), together with apertures 43 adjacent to the roots of the fingers 42, with the gaps between the fingers opening into the apertures 43.

The Belleville ring 41 bears internally on the annular bead 24, while externally the ring 41 bears on a annular lip 51 of the pressure plate 5. In this example, the annular lip 51 is divided into separate sections. The assembly tabs 25 extend through the apertures 43 of the diaphragm, being then bent radially outwards in the direction away from the axis of the assembly, so that they are hook-shaped. The purpose of the tabs 25 is to locate in position a sealing ring 14. This ring 14 constitutes a secondary engagement element for the Belleville ring 41, facing the bead 24.

In this way, the diaphragm 4 is mounted for tilting movement on the cover plate 2, and bears on the latter so as to urge the pressure plate 5 towards the reaction plate 1, thereby enabling the discs 6 to 10 to be gripped. More precisely, the intermediate disc 6, the friction disc 10, the intermediate disc 7, the friction disc 9, and the intermediate disc 8 are interposed in axial succession, in the order mentioned, between the reaction plate 1 and the pressure plate 5.

The discs 6, 7 and 8, which in this example are driving discs, are secured to the reaction plate 1 and the cover plate 2, for rotation with them, through the crown 3 which thus acts as an intermediate drive member. The discs 9 and 10, which in this example are driven discs, being arranged alternately with the intermediate discs 6, 7 and 8, are mounted so as to be rotatable with the hub 11 while being movable axially. They are surrounded by the skirt portion 22 of the cover plate 2, by the discs 7 and 8, and by the pressure plate 5.

The crown 3 has means for coupling it in rotation, so as to drive the intermediate discs 7 and 8 while preserving their ability to move in the axial direction. In this example, this rotary coupling means consists of a plurality of axial lugs 32, fixed to the crown 3 (see FIGS. 3 and 6). Each lug 32 defines a mortice 36. The lugs 32 extend axially towards the base portion 23 of the cover plate, the mortices 36 being open towards the base portion and closed by a ring 31 of the crown 3. A plurality of tenons 71, 81 are arranged to cooperate with the mortices 36. These tenons 71 and 81 are carried by, and project radially from, the respective intermediate discs 7 and 8, see FIG. 6.

The lugs 32 are fixed to the closure ring 31 (and in this example they are integral with it). The ring 31 is inserted axially between the reaction plate 1 and the fastening flange 21 of the cover plate 2. The outer diameter of the closure ring 31 is, in this example, equal to the outer diameter of the fastening flange 21 of the cover plate 2. In this exsample, the lugs 32 are made integral with the closure ring 31 by being formed simultaneously by moulding or casting.

In a modification, the lugs 32 may be separate elements mounted on the closure ring 31, for example by welding, or by the use of screws or any other suitable type of fastener.

Referring to FIG. 3, the cover plate 2 is of a standard type, with its skirt portion 22 being provided with openings 27, each of which is delimited by a radial hood portion 28. The hood portion 28 is joined to the fastening flange 21, and would normally serve for securing tangential tongues which couple the pressure plate to the cover plate for rotation with it. Each of these tangential tongues is normally secured at one end to a corresponding hood portion 28, and at its other end to a radial lug of the pressure plate, which extends radially into the opening 27. In the present case, however, use is made of the opening 27 for insertion of the axial lugs 32, these lugs being designed and dimensioned accordingly.

Figure 5:
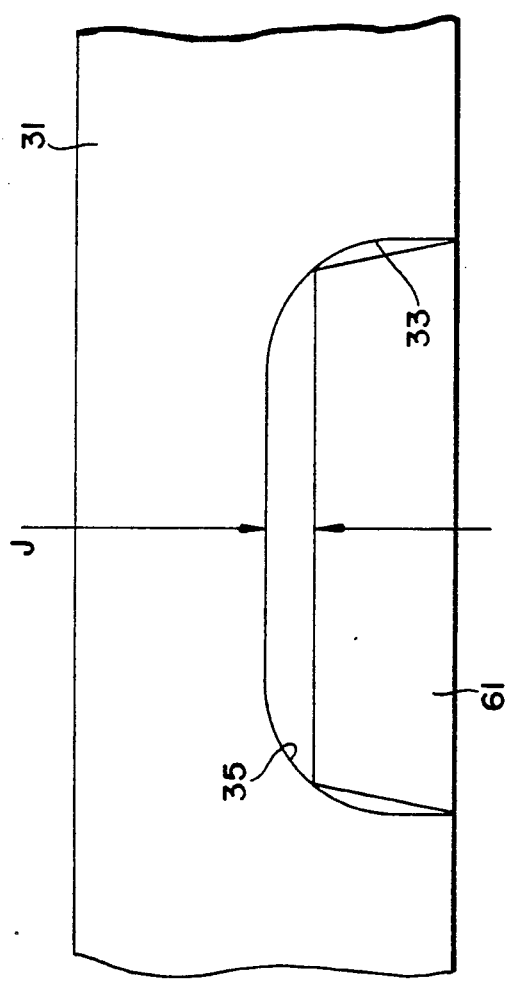
FIG. 5 is a detail view showing the form of the notch formed in the intermediate crown on the clutch.

The intermediate driving member or crown 3 has at least one thrust surface 35 (see FIGS. 5 and 6) which faces towards the reaction plate 1, while the intermediate disc 6 adjacent to the reaction plate 1 has a cooperating reaction surface 61, which engages the thrust surface 35 so as to locate the intermediate disc 6 axially with respect to the reaction plate 1. In this example, the intermediate disc 6 has at least one reaction surface 61 which cooperates with a notch 33 formed in the closure ring 31, on the side of the latter which faces axially towards the reaction plate 1. The thrust surface 35 is formed in the notch 33 itself, while the reaction surface 61 is formed on a projecting tenon of the intermediate disc 6.

Thus, a coupling of the tenon and mortice type is provided, with the intermediate discs 6, 7 and 8 carrying a first part of the tenon and mortice type coupling, while the intermediate crown member 3 carries the second, complementary, part of the coupling. The second part of the coupling includes at least two elements, which in the present example consist of two mortices 33, 36.

It is of course possible to reverse the arrangement, so that each intermediate disc, for example the discs 7 and 8, include at least two mortices while the intermediate crown 3 has at least two complementary tenons for cooperation with these mortices.

It will be noted that in this example, each intermediate disc has three tenons which are spaced apart circumferentially at 120° with respect to each other. It will also be noted that the cover plate 2 has three hood portions 28 and three openings 27. The crown 3 has three axial lugs 32, three mortices 36, and three notches 33.

The outer diameter of the discs 6 to 10 determines the internal diameter of the closure ring 31 and of the lugs 32, according to requirements, but in such a way that, in particular, the discs 7 to 10 are able to penetrate within the circular envelope defined by the lugs 32, while the intermediate disc 6 can penetrate into the interior of the closure ring 31.

In this example the closure ring 31 is of metal. The notches 33 may be formed by a milling operation, and may extend through the whole radial height of the closure ring 31. The shape of the notches 33 depends on that of the tenons of the intermediate disc 6.

The number of tenons 81, mortices 36, notches 33 and hood portions 28 depends on the requirements of the application to which the clutch is to be put, and on the size of the cover plate 2. The same is true for securing means which are indicated at 15 in FIGS. 3 and 4, and which will be described later herein. There may however be more than three of each of these elements. It is even possible to differentiate between the intermediate disc 6 on the one hand and the other discs 7 and 8 on the other hand, by providing a number of notches 33 that is different from the number of mortices 36. The tenons of the discs 6, 7 and 8 overlap the notches 33 and mortices 36 radially in this example. The notches 33 are here arranged at the level of (i.e. in circumferential alignment with) the lugs 32, which have two lateral shouldered portions 34 to support the heads of screws 16 securing the crown 3 to the reaction plate 1. The mechanical strength of the crown 3 is thus able to be made satisfactory despite the presence of the notches 33. In addition, because of the screws 16 and notches 33, it is possible to build a sub-assembly consisting of the crown 3, the intermediate disc 6 and the reaction plate 1, thus enabling the intermediate disc 6 to be inspected.

The cover plate 2 is also secured to the reaction plate 1 by means of screws (not shown), which extend through holes 29 in the fastening flange 21 of the cover plate, and through corresponding holes formed in the closure ring 31 (see FIG. 3).

The notch 33 has a base portion which is joined through rounded portions 35 to two axially disposed side flanks of the notch, and is generally U-shaped. The projecting tenon 61 has a circumferential width, subject to fitting clearances, equal to the distance separating the side flanks of the notch 33. Its thickness is less than the depth of the notch 33, so that a clearance J (FIG. 5) exists between the base of the notch 33 and the tenon 61 with its inclined flanks. The edges of the tenon 61 constitute stop or reaction surfaces and are inclined at sharp angles. They are designed so as to cooperate with the rounded portions 35 of the thrust surface, these rounded portions constituting the actual working part of the latter.

The face of the intermediate disc 6 and the face of the intermediate crown 3 that face towards the reaction plate 1 lie in the same plane. Thus, during assembly by tightening the screws 16 into the reaction plate 1, the crown 3 is offered up to the reaction plate 1 so that the tenon 61 comes to bear on the rounded stop surfaces 35. In this way, the intermediate disc 6 is located axially without any play, but with coupling in rotation.

Since the clutch is intended for use in a fast motor vehicle, the intermediate discs 6, 7 and 8 in this example contain carbon, as do the friction discs 9 and 10. The latter are coupled to the hub 11 through teeth 91 and 101 (see FIGS. 6 and 4), which engage in complementary axial grooves 117 formed in the hub 11.

The hub 11 has an integral central portion with a splined internal bore, for mounting it on the input shaft (not shown) of the gearbox of the vehicle, for rotation with the input shaft. This central portion carries a radial web 111, which itself carries a fork 112 having two branches spaced apart from each other and extending radially outwards. The branches of the fork 112 are separated by a groove or gap 118. The width of each branch of the fork is greater than the thickness of the thickened inner periphery of the friction disc 10 or 9 concerned. The branches of the fork 112 are provided with grooves 117, with which the teeth 91 and 101 of the friction discs 9 and 10 respectively are arranged to cooperate. In order to facilitate machining, the grooves 117 are aligned axially from one branch of the fork to the other. Machining is then carried out by axial traverse of the fork 112.

It will be noted that in this example, the teeth 91 and 101 are trapezoidal in shape, and that the grooves 117 are of the same shape. The grooves 117 are bounded by projections 116 (which are here radial), while the teeth 91 and 101 are bounded respectively by recesses 92 and 102.

Each of four of the projections 116 accommodates one of four rivets 114, for which purpose they have apertures through which the rivets 114 can pass. The head of each rivet 114 bears on the surface of the branch that faces towards the other branch of the fork. The rivet head thus lies in the groove 118. Besides accommodating the rivet heads, the groove 118 also enables the inertia of the hub 11 to be reduced. The rivets 114 are hollow, and extend through the corresponding branch of the fork 112. The other end of each rivet is upset so as to retain a ring 113 in contact with the corresponding axial end face of the fork 112.

In this instance, each branch of the fork 112 is provided with two of the rings 113 and two rivets 114. The rings 113 define shoulders which are adapted to cooperate respectively with the disc 9 and the disc 10.

Due to the above arrangement, the hub 11 is located axially by the friction discs 9 and 10, so that during the assembly operation, while the input shaft of the gearbox is being inserted in the hub, there is no danger of the hub being ejected.

In addition, the rings 113 enable the movement of the friction discs 9 and 10 to be limited during a declutching operation. This enables the discs 9 and 10 to be displaced by a satisfactory amount. Furthermore, it also enables a sub-assembly, readily able to be handled and transported, to be built. This sub-assembly comprises the friction discs 9, 10 and the intermediate disc 7. All of this simplifies the clutch assembly operation.

The securing means 15 mentioned earlier comprise axial securing means having a resilient gripping action, and are mounted between the pressure plate 5 and its associated intermediate disc 8. The axial securing means comprise at least one axial fastening device 15 inserted in a hood portion 28.

In this example, the intermediate disc 8 adjacent to the pressure plate 5 is joined to the latter through at least one of these fastening devices 15. It is the fastening devices 15 that exert the resilient gripping force. Each device 15 is fitted in a tenon 81 carried by the intermediate disc 8. One fastening device 15 is associated with each tenon 81, as can be seen in FIG. 1. The number of the fastening devices 15 can of course be smaller than the number of tenons 81.

Figure 7:
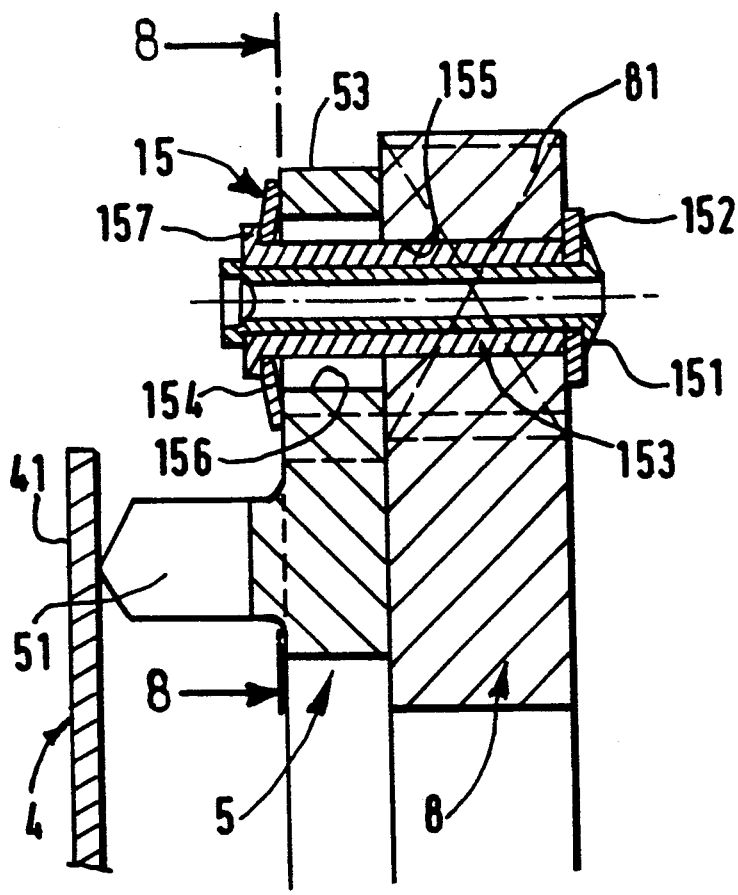
FIG. 7 is a view in cross section showing the securing means whereby the pressure plate is attached to its associated intermediate disc.
Figure 8:
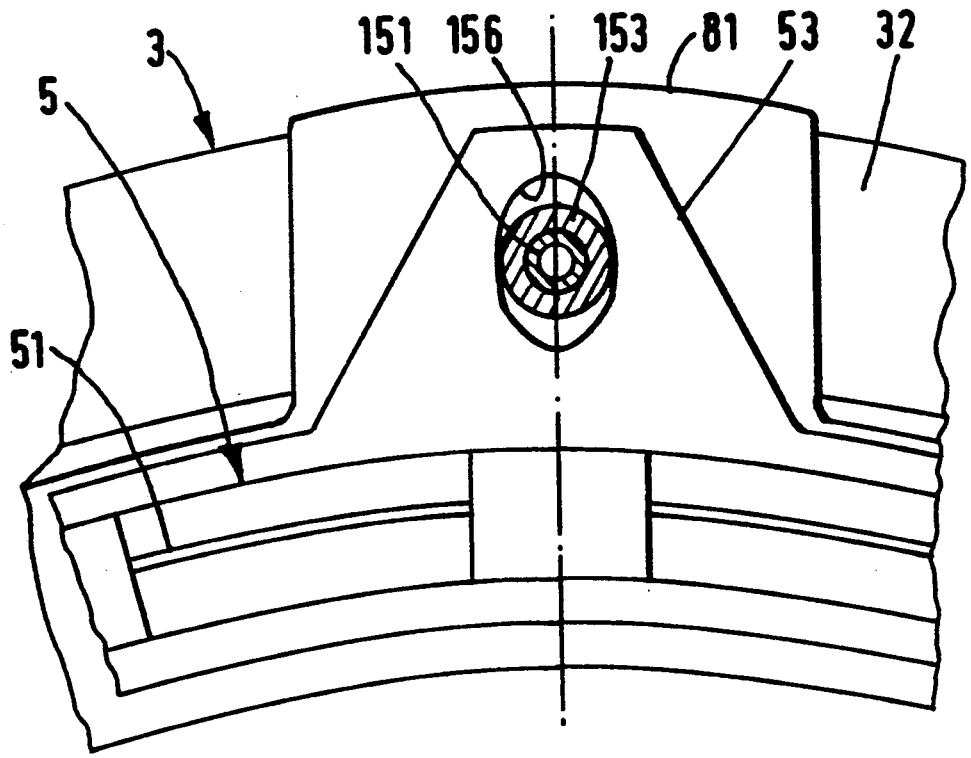
FIG. 8 is a partial view, seen in cross section on the line 8—8 in FIG. 7, with the intermediate crown included.

Referring to FIGS. 7 and 8, the pressure plate 5 has three ears 53, trapezoidal in shape and projecting radially outwardly from the outer periphery of the pressure plate. These ears 53 lie in line with the corresponding tenons 81 of the intermediate disc 8, as can be seen best in FIG. 8.

As is best seen in FIGS. 7 and 8, each of the three fastening devices 15 comprises a ring 152 and a tubular rivet 151, which passes through a centering and spacing tube 153 having a shoulder 157 at one of its ends. The tube 153 and the rivet 151 pass through an opening 155 which is formed in the tenon 81, and a hole 156 which is formed through the ear 53. The fastening device 15 also includes an axially acting resilient means 154, which in this example is a Belleville ring. The latter bears, firstly on the face of the ear 53 which is directed towards the diaphragm 4 (and therefore towards the base portion 23 of the cover plate 2), and secondly on the shoulder 157 of the tube 153.

Instead of the Belleville ring 154, this resilient means could instead consist of a coil spring or a corrugated ring, for example of figure-of-eight form.

The other end of the tube 153 is in contact with the ring 152, bearing against the face of the tenon 81 which is directed away from the ear 53, and therefore facing towards the reaction plate 1.

In a modification, in place of the tube 153, a shouldered centering pin may be provided, this centering pin being adhesively secured to the tenon 81. In a further modification, a screw or bolt may be used, fixed to the tenon 81 and having a plain centering portion for cooperating with the hole 156.

The ring 152 is held in position by the upset end of the expandable rivet 151. The head of the latter is shouldered and is in contact with the shouldered end 157 of the tube 153, while the main portion or shank of the rivet 151 passes through the tube 153.

The hole 156 in the ear 53, which in this example is narrower in the circumferential direction than the tenon 81, is oblong in shape, with parallel side edges extending radially and joined to each other through rounded base portions. The axis of symmetry of the hole 156 passes through the centre of rotation of the pressure plate 5, and the tube 153 is in point contact with the side edges of the holes 156. The pressure plate is thus centred with respect to the axis of the assembly, by virtue of the tube 153 cooperating with the contour of the hole 156, together with the tenon 81 which is centred by the axial lugs 32 (FIG. 3). The pressure plate 5 is butted against the intermediate disc 8, which enables the length of the lugs 32 to be reduced.

The tenons 81 are themselves in cooperation with the mortices 36 of the crown 3. Accordingly, the pressure plate 5 is movable axially with respect to the cover plate 2, while being coupled to the latter, for rotation with it, by means of the tenons 81 and tubes 153.

The intermediate disc 8 is made of a carbon based material, while the pressure plate 5 is for example made of aluminium. By virtue of the shouldered tube 153, the resilient means 154 and the hole 156, it becomes possible to absorb any differential thermal expansion or contraction that may arise due to differences in temperature between the intermediate disc 8 and the pressure plate 5.

The dimensions and stiffness of the resilient means 154 are selected with a view to retaining the pressure plate against the intermediate disc 8, without a clearance between them, when the clutch is operating, while still enabling the Belleville ring or other resilient means 154 to yield axially in order to accommodate thermal movement of the pressure plate 5. The length of the shouldered tube 153 is also selected accordingly, in such a way that in its compressed position, the resilient means 154 will exert a sufficiently large thrust to hold the pressure plate 5 and the intermediate disc 8 together without a clearance between them.

This arrangement is of particular advantage in a sports or racing car or other high speed motor vehicle, because the clutch is able to reach high temperatures without any risk of undue deterioration of the friction discs, while at the same time the inertia is low. By virtue of the arrangement described above, the pressure plate 5 is resiliently butted against the intermediate disc 8, without any clearance appearing between them during the retraction of the intermediate disc 8 in the declutching operation. The Belleville ring 154 causes the pressure plate 5 and intermediate disc 8 to be gripped together resiliently. As mentioned above, it is dimensioned accordingly.

It will be noted that the pressure plate 5 has radial channels 52, which are open axially at the level of the intermediate disc 8 and in line with holes 26 (FIG. 3) formed in the skirt portion 22 of the cover plate 2. This provides a ventilation facility for the pressure plate 5, which enables the temperature of the diaphragm 4 to be reduced, so avoiding any undue deterioration in the resilient characteristics of the diaphragm under the effect of heat in operation.

Figure 4:
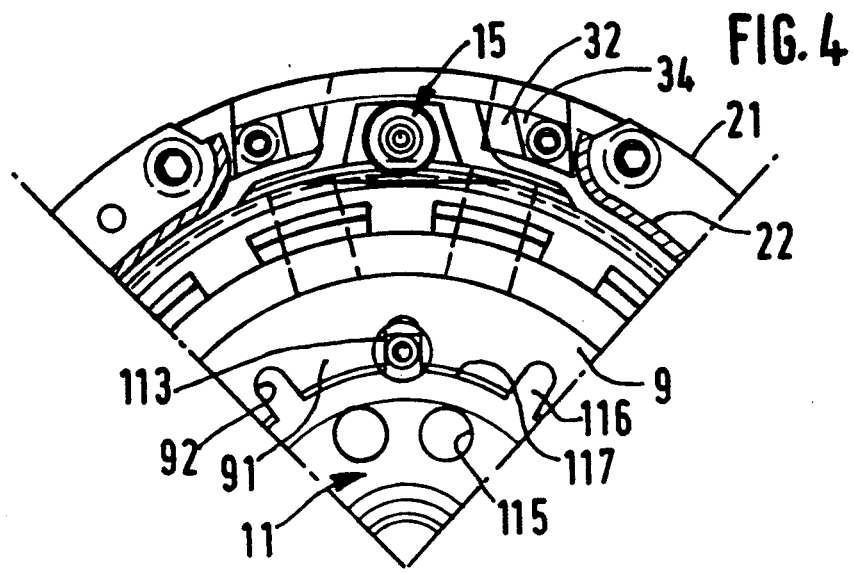
FIG. 4 is a view in cross section, showing part of the clutch, the cross section being taken on the line 4—4 in FIG. 2.

It will also be noted that the radial web 111 of the hub 11 is perforated at 115, FIG. 4, thus reducing the weight of the bub 11 and improving the ventiilation of the latter.

It is important to note that the axis of symmetry 121 of at least element of the first part of the tenon and mortice joint does not pass through the centre rotation O of the intermediate disc concerned.

Figure 6:
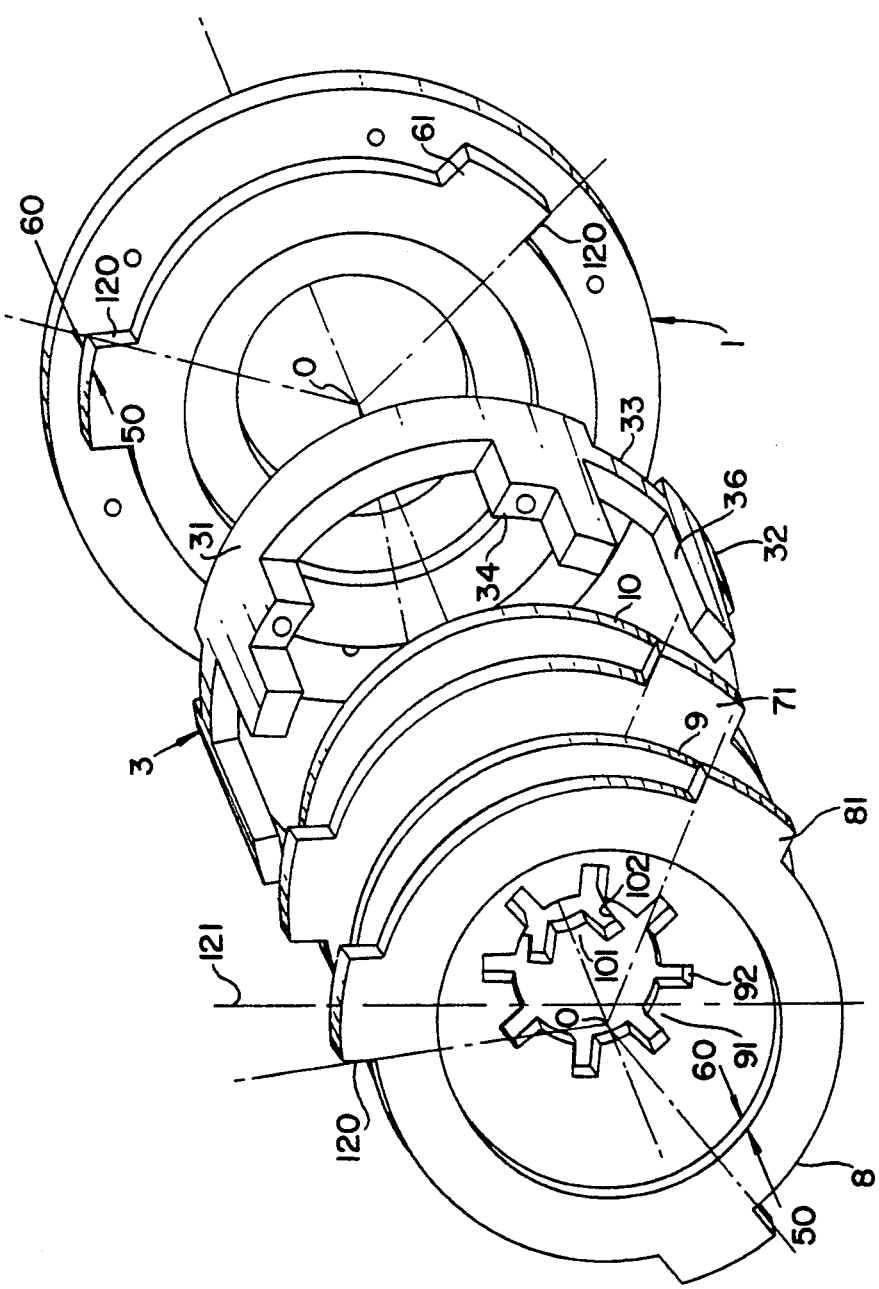
FIG. 6 is a simplified perspective view showing the intermediate discs, the friction discs, the intermediate crown and the reaction plate of the clutch in accordance with the invention.

As can be seen in FIG. 6, one of the sides, or lateral edges, 120 of the tenons 81, 71, 61 of the intermediate discs 8, 7, 6 respectively passes through the centre of rotation O of the intermediate disc concerned. This is important because, in a clutch having two or more discs, their two sides 50 and 60 (see FIG. 6) will in certain cases not be interchangeable after the clutch has been refitted. Because of the offset of the axis of symmetry 121 with respect to the centre of rotation O (FIG. 6), there is no possibility that during refitting of the intermediate discs 6, 7 and 8, the latter will not be fitted the right way round, i.e. they can only be refitted with their sides (or faces) 50 and 60 in their original positions.

By virtue of the associated feature whereby it is one of the sides 120 that passes through the centre of rotation O, it is ensured that the two sides are sufficiently different from each other to avoid any risk of any problem of recognizing which way round these components are to be fitted. The offset can of course be made smaller, with one of the sides merely passing close to the centre of rotation O.

It will be recalled that in the normal position with the clutch engaged, the diaphragm 4 bears against the bead 24 and one the lip 51 (FIG. 2), so that the pressure plate 5 is urged towards the reaction plate 1 so as to grip the intermediate discs 6, 7 and 8 and the friction discs 9 and 10 between the pressure and reaction plates. In order to disengage the clutch (i.e. to perform the declutching operation), it is merely necessary to apply a thrust by means of a clutch release bearing (not shown) on to the inner end of the fingers 42 of the diaphragm 4, so as to cause the diaphragm to tilt and overcome the axial thrust which the diaphragm exerts on the pressure plate 5.

It will be noted that during declutching, the friction discs 9 and 10 have a sufficient degree of movement, that is to say a gap exists between the discs 6, 7 and 8 and the friction discs 9 and 10. This is due mainly to the retention of the disc 6 in the axial direction (as already described), together with the engagement of the intermediate disc 8 with the pressure plate 5 which is obtained by means of the fastening devices 15. The friction discs 9 and 10 are also able to slide freely due to their mounting on the hub 11, which is achieved with only simple machining.

It will be appreciated that the fitting of the clutch makes use of sub-assemblies. These are: the sub-assembly consisting of the reaction plate 1, intermediate disc 6 and intermediate crown 3; the sub-assembly consisting of the hub 11, the friction discs 9 and 10 and the intermediate disc 7; the sub-assembly consisting of the pressure plate 5 and intermediate disc 8; and finally a sub-assembly consisting of the cover plate 2 and diaphragm 4. After the crown 3 and intermediate disc 6 have been fitted, it is then only necessary to fit into the mortices 36 the sub-assembly that includes the hub 11, then to fit the pressure plate 5 with its intermediate disc 8, and finally to fit the cover plate 2 with its diaphragm 4.

The present invention is of course not limited to the embodiments described. In particular, it is possible to use a plurality of spacing blocks fixed to the cover plate 2 and to the reaction plate 1, in the manner described in the specification of French published patent application No. FR 3 623 862A. In that case, it is the intermediate discs tht have mortices the axis of symmetry of which does not pass through the centre of rotation O of the intermediate disc concerned, while the spacing blocks define complementary tenons associated with these mortices. Each intermediate disc may of course have tenons and mortices alternating with each other, with the intermediate member 3 described above then having a similar arrangement of tenons alternating with mortices. In all cases, one of the sides or lateral edges of the tenons or of the mortices passes through the centre of rotation O of the disc concerned.

The driving blocks, if provided, may have, between the intermediate discs, circumferential extensions which are arranged to cooperate with at least one of the intermediate discs, in order to retain the latter axially.

The axial lugs 32 may comprise projections for cooperating with mortices formed in the discs 7 and 8. In a modification, these lugs comprise dowels or pins carried by the closure ring 31 and each engaging in a hole formed in one of a series of radial lugs formed respectively in the disc 7 and the disc 8.

The clutch may have more than two friction discs. The reaction plate may cooperate directly with one of the friction discs; in which case the clutch shown in FIG. 1 will only have two intermediate discs. The clutch may be of the "pull" type. Similarly the reaction plate 1 may cooperate directly with one of the friction discs, namely the disc 10.

Finally, the pressure plate may be subjected to the action of engagement means that comprise a component other than a diaphragm. This may for example consist of a hydraulic actuator device of the piston and cylinder type.

What is claimed is:
1. A clutch comprising:
a reaction plate;
a cover plate;
means securing the cover plate to said reaction plate;
a pressure plate;
means mounting the pressure plate for rotation with, and for axial movement with respect to, the cover plate;
a hub coaxial with said pressure plate and reaction plate;
at least two intermediate discs disposed between the pressure plate and the reaction plate;
at least one intermediate driving member coupling the intermediate discs to the reaction plate and the cover plate for rotation with the reaction plate and the cover plate, with friction discs being arranged alternately with the intermediate discs; and
wherein the clutch further includes a coupling of the tenon and mortice type, comprising a first part carried by the intermediate discs and a second part carried by said intermediate driving member, said first part of the coupling comprising at least two elements at least one of which defines an axis of symmetry, with a said intermediate disc associated with the first part of said coupling defining a center of rotation, coincidence between said axis of symmetry and center of rotation being absent.

2. A clutch according to claim 1, wherein the or each element of the said first part of the tenon and mortice type coupling defining an axis of symmetry has lateral edges, with at least one said lateral edge passing through said center of rotation.

3. A clutch according to claim 1, wherein a said intermediate disc is adjacent to the reaction plate, said intermediate driving member comprising an intermediate crown, the clutch further including a closure ring carried by the intermediate crown and axial lugs carried by the closure ring, said second part of the tenon and mortice type coupling being defined by said lugs between the intermediate discs and said crown, the closure ring having a face directed towards the reaction plate, and at least one notch being formed in said face of the intermediate crown, with said intermediate disc adjacent to the reaction plate having at least one tenon associated with said notch for axially locating the said intermediate disc.

4. A clutch according to claim 3, wherein the intermediate crown has a plurality of said axial lugs and the latter define mortices of the coupling, the tenons of the coupling being defined on one side intermediate disc for cooperation with said mortices, the intermediate disc having said tenons being adjacent to the pressure plate, and the clutch further including securing means mounting the pressure plate to said intermediate disc having the tenons.

5. A clutch according to claim 4, further including at least one radial ear carried by the pressure plate and having a hole formed through it, the tenon having an opening formed through it and the said securing means including a tube extending through said opening in the tenon and through the hole in the ear.

6. A clutch according to claim 5, wherein the hole in the ear is an oblong hole.

7. A clutch according to claim 3, wherein the axial lugs of the intermediate crown define mortices and are formed with side shoulders for securing the crown to the reaction plate, there being a plurality of said notches formed at the level of said mortices, with said elements of the first part of the coupling comprising tenons.

* * * * *